Nov. 21, 1967     W. H. LAZEAR     3,354,018
APPARATUS FOR HEAT SEALING INCLUDING A CLAMP AND A HEATED WIRE
Filed Nov. 29, 1963     4 Sheets-Sheet 1
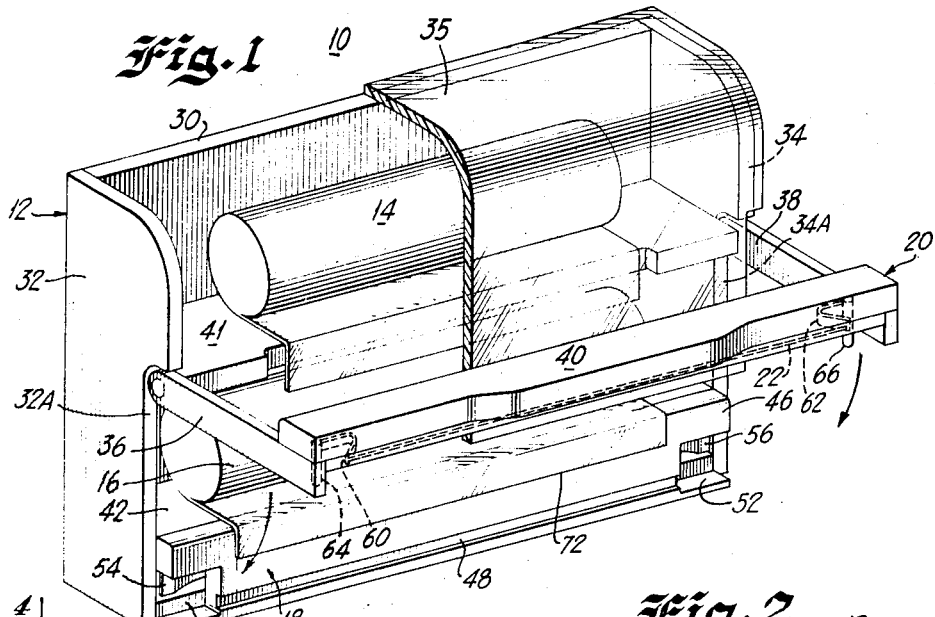
INVENTOR
WILLIAM H. LAZEAR
Mason, Kolehmainen,
Rathburn and Wyss
ATTORNEYS

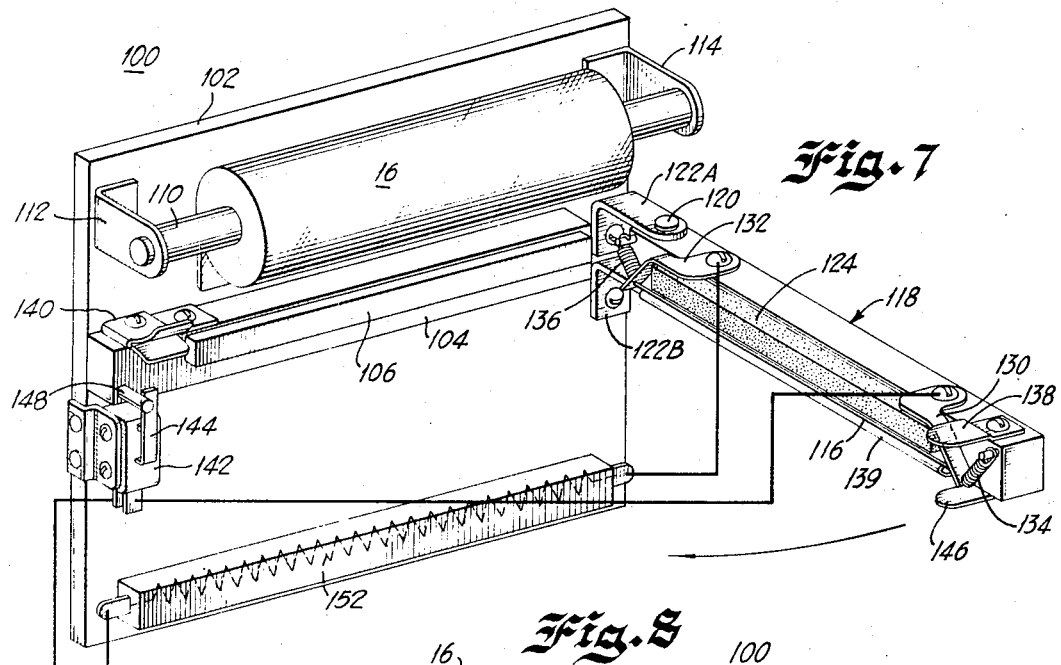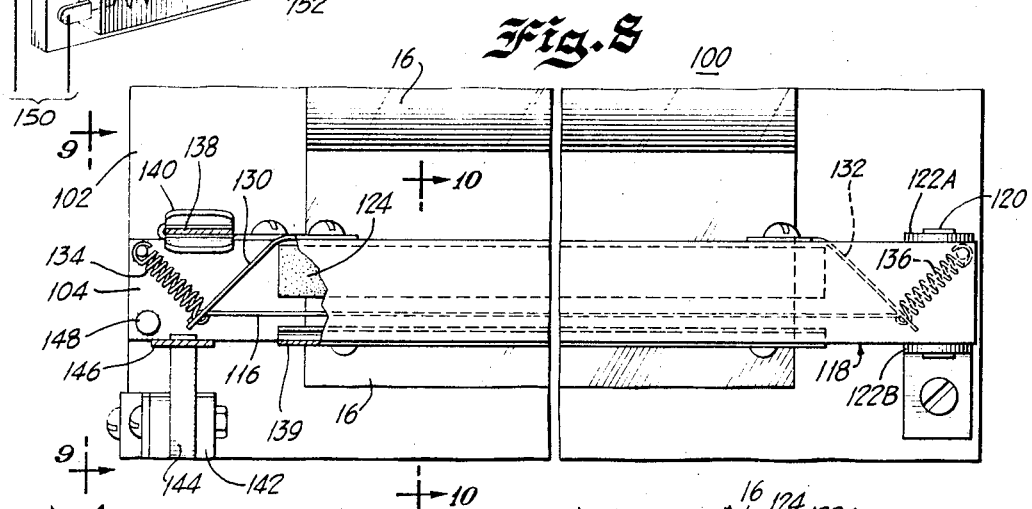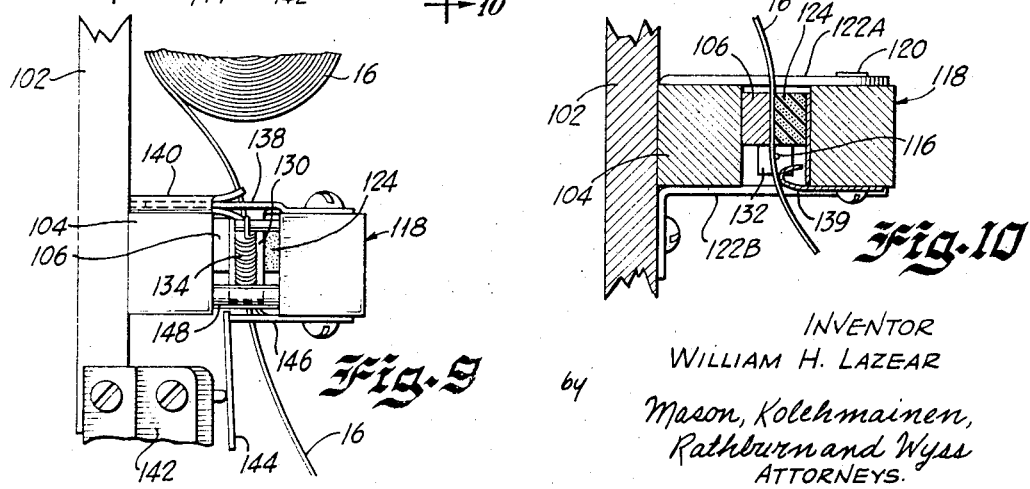

INVENTOR
WILLIAM H. LAZEAR
by Mason, Kolehmainen, Rathburn and Wyss
ATTORNEYS.

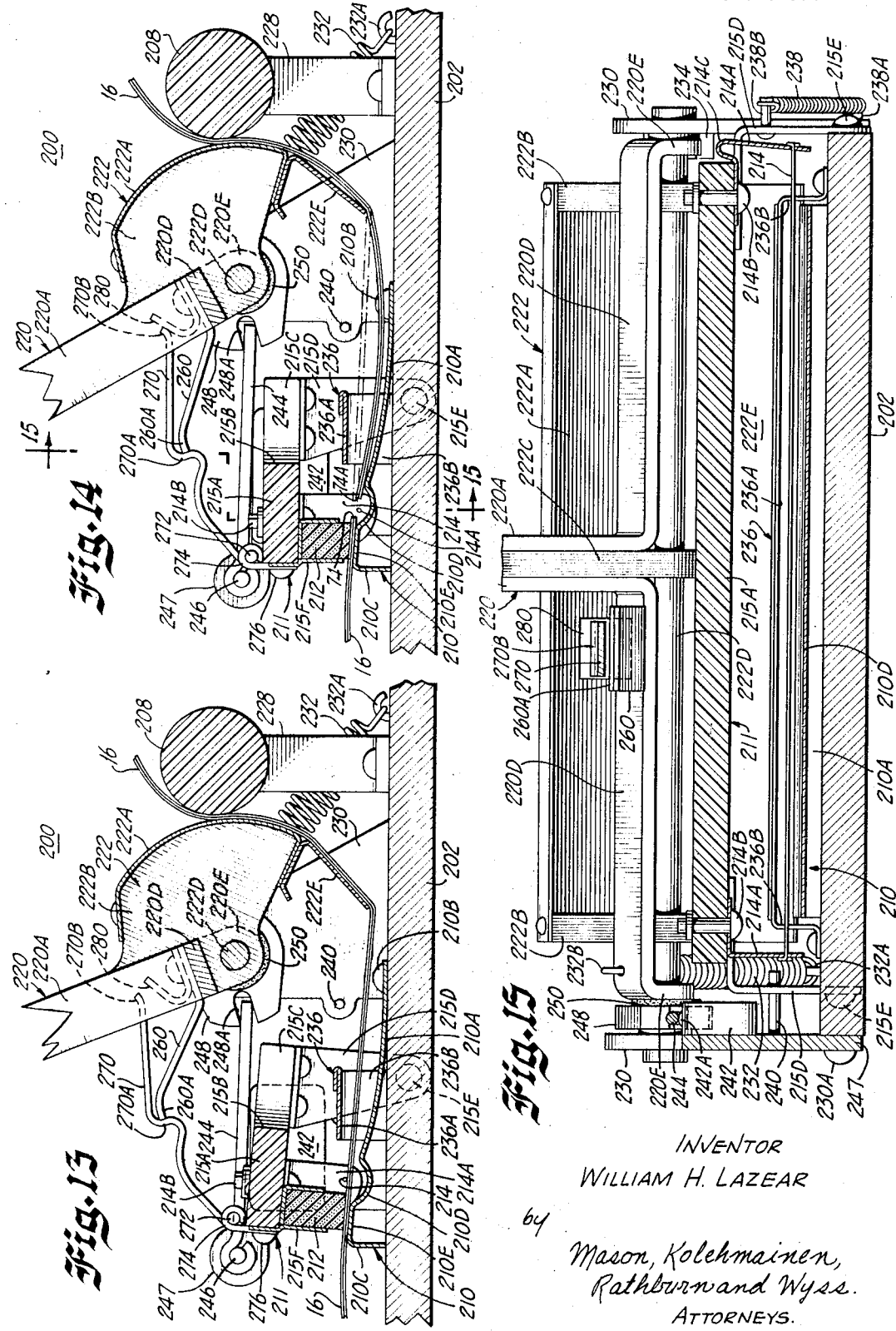

United States Patent Office 3,354,018
Patented Nov. 21, 1967

3,354,018
APPARATUS FOR HEAT SEALING INCLUDING
A CLAMP AND A HEATED WIRE
William H. Lazear, Winnetka, Ill., assignor to H & L
Machine Corp., Winnetka, Ill., a corporation of
Illinois
Filed Nov. 29, 1963, Ser. No. 326,817
10 Claims. (Cl. 156—515)

The present invention relates to improvements in an apparatus for making bags from plastic sheet material.

In the past many efforts have been made to provide apparatus for making bags from thermoplastic sheet material such as polyethylene and the like. However, the apparatus has generally been complex and it and the methods have produced bags in which both edges along a line of severance have been sealed when heated severing means were utilized.

It is an object of the present invention to provide a new and improved apparatus for making bags from tubular thermoplastic film stock in which only one edge of the two edges produced upon heat severing is sealed.

A further object of the present invention is to provide a new and improved sealing and severing apparatus in which a heated element is moved not only transversely of the plastic film but longitudinally and generally in the plane thereof in order more effectively to produce a seal along one of the two edges formed upon severance.

A further object of the present invention is to provide a new and improved apparatus for forming a single sealed edge during the severing of a strip which is maintained under substantial tension when a heated element is brought into proximity and contact with the strip.

A further object of the present invention is to provide a new and improved apparatus for severing and sealing plastic film which includes means for holding the film strip while it is maintained under tension and means comprising a heated element brought into cooperative relationship with the film after the film has been firmly gripped and tensioned.

A further object of the present invention is to provide a new and improved apparatus as set forth in the preceding paragraph in which the heated element is constructed and arranged to be moved not only transversely of the film but longitudinally and substantially parallel to the plane of the film.

A still further object of the present invention is the provision of new and improved apparatus as set forth in the preceding paragraph in which the longitudinal movement of the heated element is effected by resilient means and the thermal expansion of the heated element.

A further object of the present invention is to provide a new and improved apparatus for forming bags from plastic film strip comprising an operating handle and a cooperatively associated movably mounted heated element in which the operating handle is movable from a normal or initial inoperative position to a final position in the course of which movement the film is gripped and placed under tension, the heated element is moved transversely across the film strip and longitudinally toward the held end of the film strip, and the heated element is returned to its normal position.

A further object of the present invention is the provision of a new and improved apparatus as set forth in the preceding paragraph in which upon return movement of the operating handle from its final to its initial position a length of the film strip is projected from the machine in order to be readily grasped by the operator in the formation of another bag.

In brief, a first embodiment of the invention includes a cabinet structure housing at least one roll of tubular thermoplastic film, such as polyethylene, adapted to be drawn out to a desired length by the user. It includes also a movably mounted sealing and severing element in the form of a heated wire and film gripping or holding means. When a length of film has been pulled out to make a bag of desired length, the movably mounted supporting structure is moved to grip the film and to sever and seal the protruding portion of the film, while the film is maintained under substantial tension by the user. The arrangement is such that the heated element is not only moved transversely of the film but also longitudinally of and in the plane of the film toward the severed and held edge. As a result, the held edge is provided with a substantial seal while the severed edge that is pulled away from the equipment remains substantially unsealed to form the open end of a bag.

In the first embodiment, the movably mounted gripping and severing and sealing structure is mounted for pivotal movement about an axis substantially in the plane of movement of the film and the desired movement of the heated element is effected by spring type supports for the heated element effecting movement of the element as the latter is heated and expands longitudinally.

In a second embodiment of the invention, the film gripping and sealing and severing means is mounted for pivotal movement about one edge of the film and the desired movement of the heated element is effected by separate spring means acting on heated element supports.

A third embodiment of the invention includes a single operating handle which is operated to grip the film, apply tension to it, sever and seal the film while under tension, controls other means to return the severing and sealing means to its initial position, and which, further, on reverse movement from its final to its initial position, projects or ejects a length of film so that it can be grasped for the making of another bag.

Other objects and advantages of the present invention will become apparent from the ensuing description of illustrative embodiments of the invention, in the course of which reference will be had to the accompanying drawings, in which:

FIG. 1 is a perspective view, partly broken away, of one embodiment of the present invention in an initial or normal inoperative position;

FIG. 2 is a fragmentary front view, also partly broken away, of the embodiment of FIG. 1, but with portions thereof in a different operative position, i.e. in which severing and sealing is effected;

FIG. 3 is a fragmentary enlarged sectional view taken along the line 3—3 of FIG. 2 with an energizing circuit completed to the sealing and severing element;

FIG. 4 is a fragmentary sectional view taken along the line 4—4 of FIG. 2;

FIG. 5 is a view similar to FIG. 4 showing a different operative position, i.e., one just before or after the making or breaking of the energizing circuit for the sealing and severing element;

FIG. 6 is a fragmentary somewhat diagrammatical view illustrating different operative positions of the sealing and severing element;

FIG. 7 is a perspective view of a modified embodiment of the present invention;

FIG. 8 is a plan view, partly broken away, of the device of FIG. 7 with the film clamped and the sealing and severing element in position to seal and sever upon some further movement;

FIG. 9 is a fragmentary side view taken along the line 9—9 of FIG. 8;

FIG. 10 is a fragmentary sectional view taken along the line 10—10 of FIG. 8;

FIG. 13 is a fragmentary view similar to FIG. 12 with the apparatus in an intermediate position ready to effect sealing and severing;

FIG. 14 is a view similar to FIG. 13 but with the apparatus in a position in which the plastic tubular strip has been sealed and severed to form a bag, and shortly before the operating handle has reached its final position and the sealing and severing means is released for return to its initial position;

FIG. 15 is a cross sectional view taken along the line 15—15 of FIG. 14; and

Figure 11:
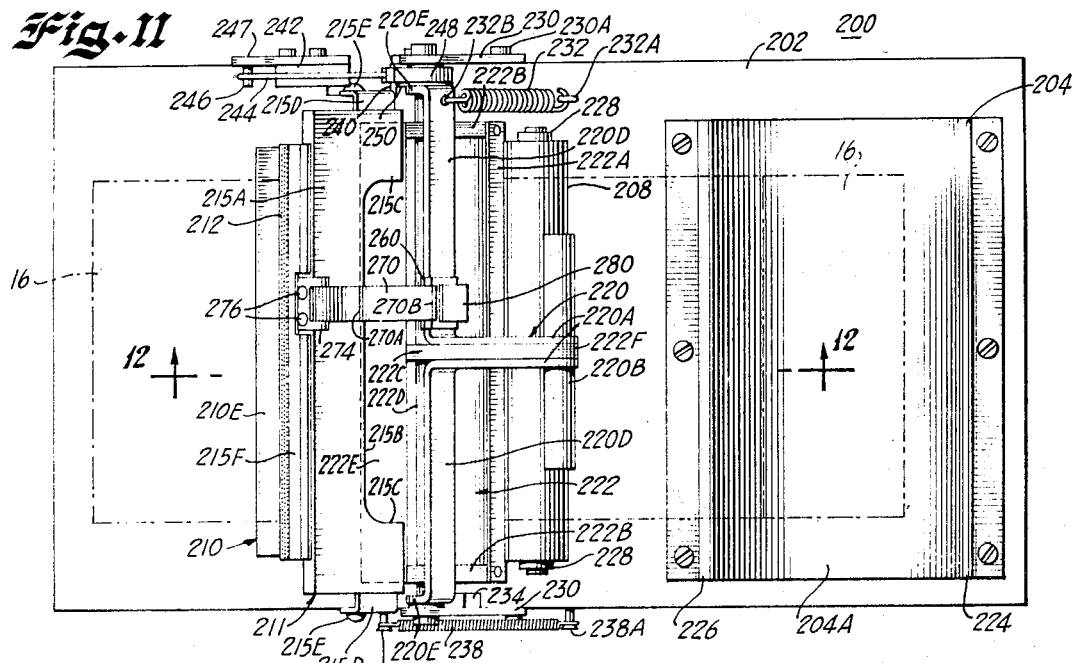
FIG. 11 is a plan view of a further embodiment of the present invention including a manually operable handle for effecting sequentially several operations in the making of a bag.

Referring now to the drawings and first to FIGS. 1 to 6, a plastic bag making apparatus constructed in accordance with the present invention is illustrated primarily in FIG. 1 where it is indicated as a whole by reference character 10. The main components of the device are what may be considered a cabinet 12 holding upper and lower rolls of flat tubular thermoplastic film 14 and 16 of different widths, and including a lower stationary film clamping element 18. Upon the cabinet is movably mounted structure 20 supporting an energizable heated wire type sealing and severing element 22 and an upper film clamping or gripping element 24 and constructed and arranged in accordance with the present invention, as will be described more fully hereinafter.

The cabinet has been illustrated as mounted in a vertical position but it can be mounted equally well in a horizontal position. The cabinet includes a back (or bottom) 30, spaced apart side walls 32 and 34 and a detachable cover 35. The side walls are cut away as indicated by the reference characters 32a and 34a to provide recesses for the lever arms 36 and 38 of the supporting structure 20, which are connected by a cross piece 40 and pivotally mounted on the side walls and at the underside of which is fixedly secured the film clamping element 24, which is preferably made of sponge rubber or the like. The cabinet includes upper and lower partitions 41 and 42, these providing compartments for the upper rolls of the thermoplastic film. The cabinet includes also a bottom wall 44 underneath clamping element 18. The partitions and bottom wall are secured to the base 30 and to the side walls 32 and 34 in suitable manner, not shown.

The clamping element 18 is suitably secured to the partition 42 and bottom wall 44 and extends across the width of the cabinet. It is provided with a rounded upper front edge 46 so that the film stock can be readily drawn over it in close contact with it and so that tension can be applied to the film by the operator during the bag making process. Clamping element 18 has a groove 48 extending across it near its lower edge, the groove being provided for reception of the heating element 22 in its lowermost operated position, as will be described shortly.

The opposite ends of clamping element 18 are provided with recesses 50 and 52 to give access to leaf spring type electrical terminals 54 and 56 through which the element 22 is energized when the movable supporting structure is brought into operative position in the sealing and severing of the tubular material. The terminal 54 is more fully illustrated in FIG. 3 in which it may be seen to be secured to the underside of clamping element 18 where it is mounted as upon an insulating block 58. The terminal 54 is connected to one terminal of a power source through a resistor 57 placed in the circuit to control the flow of electricity to and the heating of the element 22. While not illustrated in detail, the terminal 56 may be mounted like the terminal 54 and connected to the other terminal of the power supply.

One of the important features of the present invention has to do with the mounting and operation of the element 22. It is so arranged that it is normally de-energized and thus is a relatively cold state. It is energized when brought into operative position relative to the selected film stock 14 or 16. The heated element also is arranged to move in the direction of the held end of the severed stock so that this end is more effectively sealed to form the closed end or bottom of a bag. At the same time the tensioned end of the film is pulled away from the heated element so that upon severing it remains substantially unsealed.

In the illustrated embodiment, the heating element 22 takes the form of a circular wire, which may be Teflon covered. It is mounted at its opposite ends on horizontally disposed generally U or V-shaped spring arms 60 and 62 mounted at opposite ends of the cross piece 40. In the unheated state or condition, the wire 22 is in a relatively contracted condition and the spring arms are in the solid line positions indicated in FIGS. 2 and 6. When the wire is heated and expands, the spring arms maintain the wire under tension and move in parallel to the film to their dotted line positions. In so doing, the wire 22 is moved generally parallel to and in the plane of and toward the film held in the clamping element to provide an improved heat seal in the formation of the closed end of a bag at the held end of the film. This movement can be ascertained from FIGS. 2 and 6 in which the initial position of the wire 22 is its solid line position and the moved position is its phantom positon. The fixed ends of the sprng arms 60 supporting wire 22 are secured as by welding or soldering to downwardly extending contact pins 64 and 66 at the opposite ends of the cross arm 40. The contact pins are adapted to make contact with terminals 54 and 56 to which they extend through the recesses 50 and 52 when the movable support 20 is brought into a predetermined operative position. The movements of the spring arms 60 and 62 are guided by generally U-shaped brackets or housings 68 and 70 also secured to the undersides of the cross arm 40.

The upper film clamping element 24 is secured to the underside of cross arm 40 and, as already indicated, is constituted of resilient compressible material, such as sponge rubber which is adapted to engage the plastic film against the stationary clamping element 18 so that the operator can manually tension the film shortly before the heated wire is energized by the contact of pins 64 and 66 with the terminals 54 and 56. The clamping element 24 thus enables the film initially to be clamped and provides for additional movement of support 20 thereafter to effect the sealing and severing.

In operation, a length of the tubular thermoplastic film 16, for example, is drawn downwardly over the clamping element 18. Assuming that no bag had previously been made, then the end 72, as shown in FIG. 1, of the material is drawn down a distance sufficient to make a bag of desired length. It is firmly held by the operator in one hand. The operator then uses his other hand to move the supporting structure 20 downwardly first to grip the film between clamping elements 18 and 24 and then to bring the wire element 22 into contact with the plastic material. When this is done, element 22 is energized by contact between the pins 64 and 66 with the terminals 54 and 56. As a result, the heated wire element is rapidly heated. At the same time, the operator firmly holds the clamped film under substantial tension. As a result of the heating of the initially cold element, the film is first heated and softened and the pull applied to it severs first the outer layer of the strip and then the lower layer, and thus a length of the plastic film, the portion that is tensioned by the operator, is severed from the remainder. The part thus severed has its end relatively unsealed. The severed edge of the film remaining in the device, however, is effectively sealed by its continued close proximity to the heating element 22 coupled with the movement of the latter toward the held end of the strip.

Figure 16:
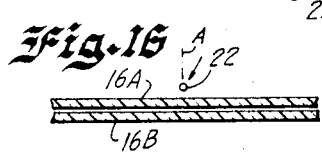
FIGS. 16, 17 and 18 are diagrammatical views illustrating different operative positions of a heat sealing and severing element relative to the plastic strip material in the process of making a bag sealed at one end in accordance with the present invention.
Figure 17:
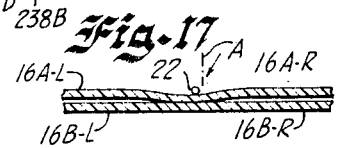
Figure 18:
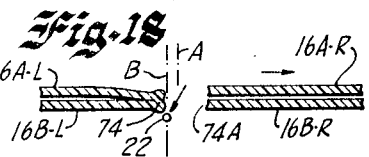

The severing and sealing operation is further illustrated in somewhat exaggerated fashion in FIGS. 16, 17 and 18. Referring first to FIG. 16, the tubular plastic film 16 from the roll includes an upper or outer layer 16A and a lower inner layer 16B. Actually these are in contact with each other but are shown separated in FIG. 16. In FIG. 16 the wire element 22 is shown approaching the plastic material and its longitudinal position is at line A. At this time it is unheated. In FIG. 17, the element has become heated and has softened the upper layer 16A, as indicated by reference character 16. The tension applied to the right end, as viewed in FIG. 17, tends first to sever the right portion of the upper layer from 16A–R from the left 16A–L. Conseqently, there is relative movement between the portions 16A–R and 16A–L. The wire continues to be heated and to move transversely of the film and toward the left (from the solid to the dotted line positions of FIG. 3) to longitudinal line B, the right portions of the layer 16A–R and 16B–R are severed and pulled away by the tension applied to that end. The left portions 16A–L and 16B–L are quite effectively sealed, as indicated by the reference character 74, as the heated wire element moves downwardly and generally parallel and generally in the plane of the plastic material to the held end to line B, remaining quite close to the sealed end 74. This sealed end forms the closed bottom of a bag. The right severed edge 74A is substantially unsealed, although it may be lightly sealed, but only slightly so that the layers can readily be separated.

From the foregoing it may be noted that the heated wire element acts upon the film at an unsupported region and moves relative to the film substantially in the plane of the film and toward the edge to be sealed.

Now, when a bag is to be made, a desired length of the material is pulled from the roll 16 and the above described operation is repeated. The portion of the stock which is removed includes the sealed end 74 and a substantial open opposite end. The part remaining in the apparatus is provided with a seal corresponding with the seal 74, ready for making the next bag.

It will thus be seen that the present method and apparatus is especially suited for forming bags from the thermoplastic tubular stock. However, the invention can be used for severing and sealing multilayer non-tubular plastic material, such as strips.

The embodiment of the invention illustrated in FIG. 7 is in many respects like the embodiment of FIGS. 1 to 6. The apparatus, indicated by the reference character 100, includes a base plate 102 upon which is mounted a support 104 to which is affixed a stationary clamping element 206. Above the latter is mounted a roll of tubular thermoplastic material 16 adapted to be made into bags. The roll is mounted on a support 110 mounted, in turn, upon spaced brackets 112 and 114 suitably secured to the base plate 102.

A sealing and severing wire element 116 is mounted at the inner or underside of a movable lever or support 118 provided with a pivot pin 120 at one end whereby it is mounted for pivotal movement on the support brackets 122A and 122B secured as by screws adjacent one edge, the right edge, of the base plate 102 in proximity to clamping element 106. A sponge rubber film clamping element 124 is also mounted at the underside of the lever 118. It is arranged relative to clamping element 106 so that the plastic material is gripped between it and the clamping element enabling tension to be applied to the plastic material by the operator and the plastic to be heated and severed by the wire 116, which is disposed a short distance forward of the clamping element, as viewed in FIG. 7.

The heated wire element is mounted on a pair of resilient generally diagonally disposed mounting arms 130 and 132 secured to the underside of lever 118. The arms are biased outwardly by the springs 134 and 136. The mounting of the arms and action of the springs is such that as the wire 116 is heated it is moved toward the held portion of the plastic material, i.e., toward the clamping elements, the same as in the previously described embodiment.

The movable support 118 is guided and held in proper relationship with respect to the clamping element during the heating and severing operation by guiding means including a tongue-like element 138 at the free end of the lever and a socket defining structure 140 on the base plate having a flared opening whereby the tongue 138 can more readily enter the socket. A rounded film guide 139 is disposed at the front underside of lever 118.

In this embodiment of the invention a microswitch 142 is utilized to control the energization of the wire 116. The microswitch includes a movable lever 144 which is adapted to be actuated by a switch operating element 146 at the free end of the lever 118. In order to prevent undesirable excessive movement of the lever 118, its movement toward the base plate is determined by a stop 148.

Power is supplied to element 116 through wires 150, one of which is connected to wire support 132 through resistor 152 and the other of which is connected to wire support 130 through microswitch 142.

In operation, a length of plastic tubing is pulled from the roll 16. Thereafter the lever 118 is brought into position to hold one end of the plastic material while the pulled out portion is thus placed under tension after which the heated wire element heats and seals the held severed edge of film 16. The bag sealing and severing operation is the same as that described in connection with the first embodiment and, consequently, this description will not be repeated at this point.

In FIGS. 11 through 15 there is illustrated an embodiment of the invention constructed and arranged mechanically to place the thermoplastic film under tension and to seal and sever the same by means of a single operation of a manually operable lever which, upon return to its initial position, also ejects a length of film so as to enable the user readily to pull out a desired length of film to make another bag.

Referring now to FIGS. 11 through 15, the apparatus as a whole is indicated by the reference character 200. It includes in the main a base plate 202 adapted to be placed flat on a table or the like; a trough-like receptacle 204 for the reception of a roll of thermoplastic film 16; a roller 208 over which the film travels; stationary clamping element 210; a movably mounted assembly 211 including a clamping element 212 and a heated wire element 214; and an operating arm or handle 220 for operating the clamping element and heated element assembly and also film tensioning and ejecting means 222.

The base plate 202 may be a plate of wood or other material and of generally rectangular shape.

The film receiving trough structure 204 may conveniently be made of some material such as aluminum. It has a central trough 204A and upstanding legs 224 and 226, the latter of which, at least, has a rounded top 226A over which the plastic film 16 travels to the roller 208.

The roller 208 is rotatably mounted above the base upon a pair of upstanding legs 228 suitably secured to the base plate. The top of the roller rises some distance above the top 226A of the trough and is disposed a short distance to the front of the trough.

The stationary film clamping element 210 located near the front of the device has a slightly concave rear portion 210A that is secured as by screws 210B to the top of the base plate, the screws being substantially below the pivot point of the operating handle 220. The forward end of element 210 has a downwardly extending leg 210C extending a short distance above the top of the base plate. Slightly rearwardly of the leg is a hollow shallow trough 210D to provide a space or longitudinal groove for the wire 214 in its final operating position, this groove corresponding to the groove 48 of the first described embodiment. Between the groove and leg 210C is a slightly inclined clamp region 210E at which point the film is adapted to be tightly clamped by the movable clamping element 212 which may be made of sponge rubber, as in the other embodiments.

The assembly 211 with clamping element 212 and the wire 214 is pivotally mounted on the base plate. The assembly includes a cross arm or piece 215A having a generally U-shaped cut out portion 215B between the extensions 215C. The cross piece is mounted on a pair of brackets 215D secured to the extensions 215C and pivoting about the pivot shafts 215E mounted at the sides of the base plate. In operation, the assembly 215 moves from the initial position illustrated in FIG. 12 to a final position illustrated in FIG. 14 and through the intermediate position illustrated in FIG. 13.

The clamping element 212 is held in place on the underside of the cross arm 215A between a pair of spaced downwardly extending metallic strips 215F secured to the underside of the arm, these strips serving better to hold the gripping element in place as it is compressed in clamping the film.

The wire 214 is supported by dependent resilient brackets 214A secured by rivets 214B or otherwise to the ends of the cross arm. One of brackets 214A has a U-shaped bight 214C (see FIG. 15) to apply a longitudinal tension to the wire 214 to maintain it taut in both its cold and heated conditions.

In this embodiment of the invention the wire does not move in the plane of the plastic by reason of its expansion and contraction but such movement is imparted to it by movement of the assembly 215 about its pivot point 215E. The location of the pivot point 215E relative to the wire 214 is such that the wire moves both transversely of the film and toward the clamped end of the film, as may best be noted by following the positions of the wire in FIGS. 12, 13 and 14.

The film tensioning and ejecting mechanism 222 is provided with a cam type peripheral film engaging plate 222A for cooperation with the roller 208 for the purpose of (a) applying tension to the film during the bag forming operation; and (b) for ejecting a length of film past the clamping elements to provide some film in position to be pulled out of the device at a later time when another bag is to be made.

The mechanism 222 includes a pair of end pieces 222B and a central somewhat similarly shaped piece 222C movably mounted on a cross shaft 222D. The cross shaft is fixedly secured as to side plates 230 secured as by screws 230A to the opposite edges of the base plate. The peripheral roller engaging plate 222A includes further a forwardly projecting extension 222E which serves to guide the strip for movement generally parallel to the base and further to tension it in operation of the apparatus, as shown in FIGS. 13 and 14.

The tensioning and ejecting mechanism 222 is actuated by the central handle 220 which has outwardly projecting portions 220A to which are secured a hand piece 220B. The handle is effectively connected to the mechanism 222 through an extension 222F of the central element 222C of the tensioning and ejecting mechanism support. The handle mechanism includes also oppositely extending handle portions 220D integral with portions 220A and having apertured turned ends 220E encircling the cross shaft 222D whereby the mechanism 222 is effectively pivotally supported on the cross shaft.

Figure 12:
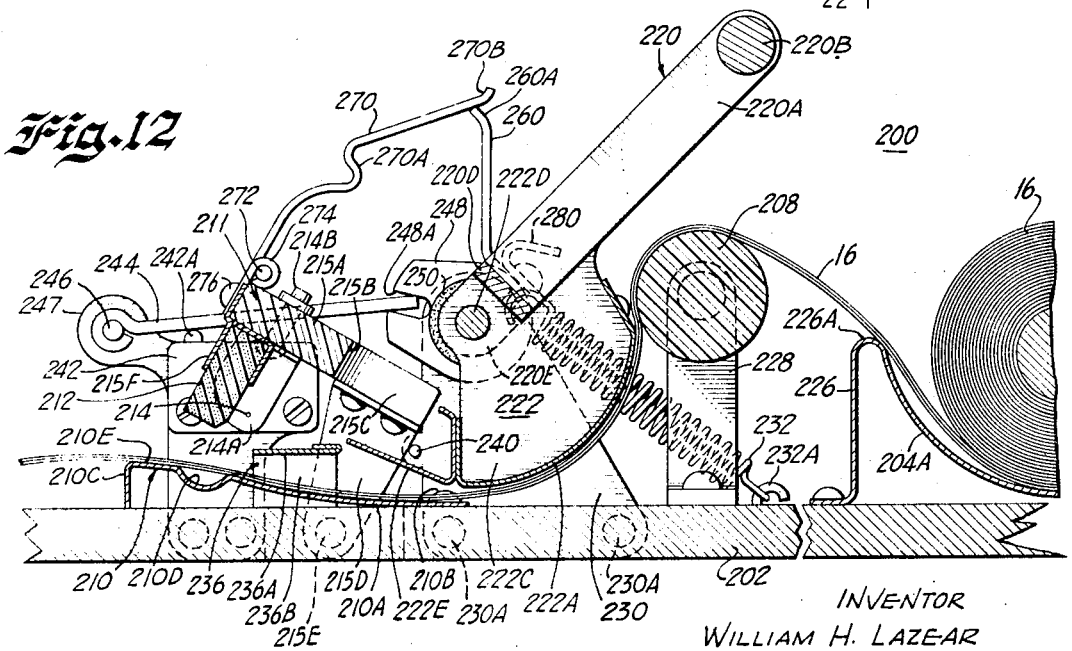
FIG. 12 is a cross sectional view taken along the line 12—12 of FIG. 11 and showing the apparatus in its normal or initial position from which it is operated to other operative positions to effect severing and sealing.

The handle 220 and mechanism connected with it is biased to its initial position, as shown in FIG. 12 by a spring 232, one end of which is secured to the base plate by a hook 232A and the other end of which is hooked on to one of the handle pieces 222D at 232B (see FIG. 11). the initial position is determined by a stop 234 engageable with the other of pieces 222D and secured at the inside of one of the side plates 230 as illustrated in FIGS. 11 and 15.

A film guiding and slot defining element 236 is located slightly to the rear of and above the wire receiving channel 210D. It includes a cross piece 236A and downwardly extending feet 236B.

The wire and clamping assembly 211 is biased to its initial position, illustrated in FIGS. 11 and 12, by a spring 238 one end of which is secured to the edge of the base plate 202 and 238A and the other end of which is secured to a pin 238B projecting outside of one of the legs 215D, as best illustrated in FIG. 11. The initial position of assembly 211 is determined by a pin 240 illustrated in FIG. 12 as engaging one of the legs 215D and disengaged therefrom in FIGS. 13 and 14. The pin 240 is conveniently mounted in one of the side plates 230.

The sealing and severing element 214 is energized upon actuation of the handle 220 when the handle is in approximately its vertical position. The energization is effected upon operation of a microswitch 242 mounted on a side plate 230, as illustrated at the upper side of FIG. 11. The microswitch is actuated by the downward movement of a lever 244 pivoted about a pin 246 on a mounting plate 247 by an actuating disc 248 having a radial recess 248A for reception of the free end of lever 244. The disc 248 is rotatably mounted on the shaft 222D and it is connected to a handle portion 222E by means of a rubber friction disc 250. Upon actuation of the handle, the disc 248 moves the lever 244 downwardly from the position shown in FIG. 12 to that shown in FIGS. 13 and 14 in which the microswitch actuating button is depressed to actuate the switch. When the switch is actuated, the element 214 is energized by closure of a circuit which has not been illustrated but which circuit extends through the wire supports 214A. Actuation of the switch by the friction element 250 enables the handle to travel further after the switch has been closed.

The handle 220 is operatively connected to the wire and clamp assembly 211 through a rigid actuating finger 260 mounted on a handle element 220D and having a downturned free end portion 260A that is cooperatively associated with a detent arm 270 on the cross arm 215A of the assembly. The detent arm 270 is pivotally mounted on a pin 272 mounted on the central portion of cross arm 215a as by a hinge leaf-like element 274 secured by screws 276. The detent arm 270 has an intermediate detent 270A engageable by the end portion 260A of the actuating finger 260 after the handle has moved some distance from its initial position toward the position of FIG. 13. When the portions 260A and 270A are engaged and the handle moved further, the assembly 211 is pivoted about pivot axis 215E and moved to the position shown in FIG. 13 whereat the film 16 is gripped between clamping elements 210E and 212. At this time the wire 214 is energized and heated and approaching the film. The film is tensioning during movement (CCW) of the handle from the position of FIG. 12 to that of FIG. 14 by the friction plate 222A engaging the film tightly against the roller 208 and effecting movement of the film in a reverse direction, i.e., back toward the trough. Also, continued movement of the handle to the position of FIG. 14 moves the wire 214 transversely across the film strip and also toward the held portion to form a seal 74 in the clamped severed portion of the film. The other severed end 74A is not substantially sealed.

Continued movement of the handle beyond the position of FIG. 14 brings the rounded free end 270B of arm 270 into contact with a generally V-shaped release element 280 mounted on handle element 220D. This element 280 lifts lever 270 from the position in which it is shown in FIG. 14, thereby to release lever 270 from engagement with lever 260. When lever 270 is released, the clamp-wire assembly 211 is returned to its initial position by the spring 238.

Thereafter, upon release of the handle 220, it is returned to its initial position by spring 238. Upon this return movement, the film 16 is fed forwardly through the machine by reason of the continued engagement of the film between the roller 208 and the plate 222A, which now moves forwardly (CW) thereby to eject the substantially unsealed end 74A of the film past the forward end of the clamping element, where it may be gripped by the user and a desired length pulled out for making another bag.

In operation, the apparatus is generally in its initial position, the one illustrated in FIGS. 11 and 12. A short portion of the film 16 projects forwardly of the clamping means where it is accessible to the user and the film is free to be pulled out. The user pulls out as much of the film as he wishes to make a bag of desired length or depth. Thereafter, the operator simply takes hold of the handle 220 and pulls it forward (CCW) from its initial position to a final position slightly beyond the position of FIG. 14. When this is done a bag is severed and formed with a sealed bottom, as illustrated in FIGS. 14 and 18 and the clamp-wire assembly 211 is returned to its initial position. After the bag has been made, the handle is released and it is returned to its initial position by spring 232, ready to operate again.

Initially, the handle is in the position of FIGS. 11 and 12. As the handle moves CCW the tensioning and ejecting means 222 engages the film between the plate 222A and roller 208 and the film 16 is then pulled back a short distance toward the spool. Shortly thereafter the arm 260 engages the lever 270, the engagement being between the end 260A of arm 260 and the detent 270A of lever 270. Continued movement of the handle then effects movement of the assembly 211 about its axis 215E to the position illustrated in FIG. 13. At this point, the forward portion of the film 16 is gripped between the clamping elements 210E and continued movement of the handle tensions the film as a result of the movement of plate 222A against roller 208, as shown in FIG. 13, which tensioning continues until the handle has been moved beyond the position of FIG. 14 to release the assembly 211 which, upon release, is returned to its initial position.

During the movement of the handle from the position of FIG. 12 to the position of FIG. 14, the wire 214 is energized by closure of switch 242 by lever 244 which is actuated through the friction drive discs 248 and 250. When the wire reaches the position of FIG. 13 it is immediately above the upper layer 16A of the film 16, which, at this time, is under considerable tension. The wire softens the upper layer more than the lower one and continued movement of the handle effects movement of the wire onto the upper layer. It appears that the upper layer is first severed and moves somewhat rearwardly and then the lower layer is softened and severed. The operation is rapid, and, the result is the formation of a good seal 74 at the severed end of the film which is held between the clamping element. The end of the film through which tension is applied is moved away from the clamped end and the severed portion 74A is either unsealed or substantially so.

It will be noted that the wire moves not only transversely through the film but toward the severed end held between the clamping elements, whereby a better seal is produced. The other end of the film, i.e., the end connected to the film that is being moved rearwardly by reason of the coaction between the mechanism 222 and the roller 208, immediately it is severed, moves away from the heated element whereby no effective seal is made thereat.

The movement of the apparatus is quite rapid and the wire and clamping elements are automatically released upon the completion of the movement of the handle from its initial position to its final position. Upon release of the handle and return from its final to its initial position by spring 232, the film 16 between the plate 222A and roller 208 is fed forwardly by frictional engagement between the two. A sufficient length of film is fed to enable the user to grasp the projecting substantially unsealed end and to pull it out to form another bag.

While the wire 214 has been shown to be a round wire, it can be made in ribbon form and actually such form has been found to be advantageous in the last described embodiment. Using a ribbon instead of a round wire results in better heating relationship between the wire and the severed end of the bag during movement of the wire downwardly and forwardly, as viewed in FIGS. 13 and 14. Also, the wire can be Teflon coated, if desired. Furthermore, ribbon type wire can be used advantageously with the first described embodiments.

While the present invention has been described in connection with the details of illustrative embodiments thereof, it should be understood that these details are not intended to be limitative of the invention except insofar as set forth in the accompanying claims.

What is claimed as new and desired to be secured by Letters Patent of the United States is:

1. Apparatus for making a bag from tensioned tubular thermoplastic film comprising fixed film clamping means, supporting structure movable transversely of the film, film clamping means mounted on said structure for holding film against the fixed clamping means, heated wire type means mounted on said support for movement transversely of the film path with the support, and means on said structure for effecting movement of said heated wire generally in the plane of the film path toward the held end of the film.

2. Apparatus for making a bag from tensioned tubular thermoplastic film comprising fixed film clamping means, movable supporting structure, resilient and compressible film clamping means mounted on said structure for holding film against the fixed clamping means, heated wire type means mounted on said support for movement transversely of the film path, and means on said structure for effecting movement of said heated means generally in the plane of the film path toward the held end of the film, said last mentioned means including means operable upon heating and expansion of the wire.

3. Apparatus for making a bag from tensioned tubular thermoplastic film comprising fixed film clamping means, movable supporting structure, resilient and compressible film clamping means mounted on said structure for holding film against the fixed clamping means, heated wire type means mounted on said support for movement transversely of the film path, means on said structure for effecting energization of the wire, and means on said structure for effecting movement of said heated wire generally in the plane of the film path toward the held end of the film, said last mentioned means including means operable upon heating and resulting expansion of the wire.

4. Apparatus for making a bag from tensioned tubular thermoplastic film comprising fixed film clamping means, supporting structure pivoted generally at opposite sides of the path of movement of the film, resilient and compressible film clamping means mounted on said structure for holding film against the fixed clamping means, heated wire type means extending across the film path and mounted on said support for movement transversely of the film, means on said structure for effecting energization of the wire when the structure reaches a predetermined position, and means on said structure for effecting movement of said heated wire generally in the plane of the film path toward the held end of severed film, said last mentioned means including spring type supports for the wire.

5. Apparatus for making a bag from tensioned tubular thermoplastic film comprising fixed film clamping means, supporting structure pivoted generally at opposite sides of the path of movement of the film, resilient and compressible film clamping means mounted on said structure for holding film against the fixed clamping means, heated wire type means extending across the film path and mounted on said support for movement transversely of the film, spring leaf electric circuit terminals at opposite sides of the film path, contact pins on said structure engageable with said terminals for effecting energization of the wire when this structure reaches a predetermined position, and means on said structure for effecting movement of said heated wire generally in the plane of the film path toward the held end of severed film, said last mentioned means including spring type supports for the wire.

6. Apparatus for making a bag from tensioned tubular thermoplastic film comprising fixed film clamping means, supporting structure pivoted generally at an edge of the path of movement of the film for movement transversely of the film path, resilient and compressible film clamping means mounted on said structure for holding film against the fixed clamping means, heated wire type means mounted on said support for movement with it transversely of the film path, means or said structure for effecting energization of the wire when its approaches the plane of the film path, and means on said structure for effecting movement of said heated wire generally in the plane of the film toward the held end of the film, said last mentioned means including means operable upon heating and expansion of the wire.

7. Apparatus for making a bag from tensioned tubular thermoplastic film comprising fixed film clamping means, supporting structure pivoted generally at an edge of the path of movement of the film for movement transversely of the film, resilient and compressible film clamping means mounted on said structure for holding film against the fixed clamping means, heated wire type means mounted on said support for movement with it transversely of the film path, means including a switch and switch operating means on said structure for effecting energization of the wire when the structure approaches the plane of the film path, and means on said structure for effecting movement of said heated wire generally in the plane of the film toward the held end of the film, said last mentioned means including means operable upon heating and expansion of the wire.

8. Apparatus for making bags from tensioned tubular thermoplastic film comprising fixed film clamping means, movable supporting structure, resilient and compressible film clamping means mounted on said structure for holding film against the fixed clamping means, and wire type heating means mounted on said support and movable therewith relative to the film path both transversely of and generally in the plane of the film toward the held end of the film.

9. Apparatus for making bags from plastic film, including in combination, means for supporting a roll of the film, a roller over which the film travels, a stationary film clamping element located beyond the roller, an assembly movably mounted between the clamping element and roller and including a clamping element cooperating with the stationary element to hold the film, a heated wire type film severing and sealing element movable with the assembly from a position spaced a substantial distance from the film to a position transversely beyond the clamped film and a switch operating member, said assembly being mounted so that the heated wire element moves transversely through the film and longitudinally of the plane of the film toward the clamping elements and said switch effecting energization of said wire, a film tensioning and ejecting mechanism between the said assembly and the roller, a handle for operating said mechanism movable from an initial position to a final position, said mechanism occupying an initial position in which the film is free to be pulled out to make a bag of desired length and being movable by the handle to its final position through intermediate positions in which the mechanism engages the film against the roller and tensions the film held by the clamping means and which mechanism, when the handle is returned from its final to its initial position, feeds a length of film beyond the clamping elements, an interconnection between said handle and said assembly whereby the assembly is moved upon movement of the handle from its initial position to its final position to clamp the film and operate the switch to energize the wire and then to effect severing and sealing of the clamped severed end of the film by movement of the wire to the position beyond the film, said interconnection including detent means through which the subassembly is moved and which is automatically operated upon movement of the handle to its final position to release the subassembly from the handle, first spring means for returning the subassembly to its initial position upon such release, and second spring means for returning the handle to its initial position upon release of the handle.

10. Apparatus for making bags from plastic film, including in combination, a base plate, a trough on the base plate for supporting a roll of the film, a roller supported on the base plate over which the film travels, a stationary film clamping element mounted on the base plate beyond the roller, a groove defining structure rearwardly of the clamping element, a slightly curved film guide rearwardly of the groove, a second film guide overlying the latter immediately rearwardly of the groove, an assembly pivotally mounted on the base plate between the clamping element and roller and including a sponge rubber clamping element cooperating with the stationary element to hold the film, a heated wire type film severing and sealing element movable with the assembly from a position spaced a substantial distance from the film to a position in the groove transversely beyond the clamped film and a switch operating member, said assembly being mounted so that the heated wire element moves transversely through the film and longitudinally of the plane of the film toward the clamping elements, a switch for effecting energization of said wire and operable by said assembly, a film tensioning and ejecting mechanism between the said assembly and the roller including a cam like plate engageable with the roller and effective to move the film when so engaged, an extension engageable with the film additionally to tension it, a handle for operating said mechanism movable from an initial position to a final position, said mechanism occupying an initial position in which the film is free to be pulled out to make a bag of desired length and being movable by the handle to its final position through intermediate positions in which the cam like plate engages the film against the roller and the extension additionally tensions the film held by the clamping means, said cam like plate feeding a length of film beyond the clamping elements when the handle is returned from its final to its initial position, a releasable interconnection between said handle and said assembly whereby the assembly is moved upon movement of the handle from its initial position to its final position to clamp the film and operate the switch to energize the wire and then to effect severing and sealing of the clamped severed end of the film by movement of the wire to the position beyond the film, said releasable interconnection including detent means through which the subassembly is moved, means automatically effecting the release of said interconnection upon movement of the handle to its final position to release the subassembly from the handle, said last mentioned means including a release lever on the mechanism, first spring means for returning the subassembly to its initial position upon such release, and second spring means for returning the handle to its initial position upon release of the handle.

References Cited

UNITED STATES PATENTS

| | | | |
|---|---|---|---|
| 2,649,672 | 8/1953 | Thompson | 156—251 |
| 2,679,280 | 5/1954 | Marsh | 156—515 |
| 3,060,075 | 10/1962 | Kincaid | 156—251 |
| 3,257,256 | 6/1966 | Lehmacher et al. | 156—515 |

EARL M. BERGERT, *Primary Examiner.*

D. J. DRUMMOND, *Assistant Examiner.*